United States Patent [19]

Hasegawa

[11] 4,192,520
[45] Mar. 11, 1980

[54] SEAL STRUCTURE

[75] Inventor: Tadao Hasegawa, Teromachi, Japan

[73] Assignee: Toyota Jidosha Kogyo Kabushiki Kaisha, Toyota, Japan

[21] Appl. No.: 907,754

[22] Filed: May 19, 1978

[30] Foreign Application Priority Data

Jan. 30, 1978 [JP] Japan .................. 53-10266[U]

[51] Int. Cl.² ........................................... F16J 15/12
[52] U.S. Cl. ........................... 277/235 B; 277/171; 277/207 R
[58] Field of Search ............ 277/34, 165, 166, 167.5, 277/170–172, 189, 207 A, 235 B, 207 R

[56] References Cited

U.S. PATENT DOCUMENTS

| | | | |
|---|---|---|---|
| 2,200,151 | 5/1940 | Burkhardt | 277/167.5 X |
| 2,306,990 | 12/1942 | Essl | 277/34 X |
| 2,552,750 | 5/1951 | Thornhill | 277/167.5 |
| 2,553,222 | 5/1951 | Wallgren et al. | 277/171 X |
| 3,166,332 | 1/1965 | Olson | 277/171 |
| 3,353,832 | 11/1967 | Coulson | 277/171 |
| 3,567,258 | 3/1971 | Scaramucci | 277/170 X |
| 3,930,656 | 1/1976 | Jelinek | 277/166 X |

FOREIGN PATENT DOCUMENTS

| | | | |
|---|---|---|---|
| 463200 | 7/1928 | Fed. Rep. of Germany | 277/171 |
| 1912106 | 10/1969 | Fed. Rep. of Germany | 277/167.5 |
| 246763 | 10/1947 | Switzerland | 277/167.5 |

*Primary Examiner*—Robert S. Ward, Jr.
*Attorney, Agent, or Firm*—Koda and Androlia

[57] ABSTRACT

A sealing structure including a substantially flat sealing surface, a gasket and a groove formed in a flange facing the sealing surface for the gasket and for applying a sealing force to the gasket in a direction substantially perpendicular to the sealing surface. A groove is formed such that the groove has inclined surfaces with the width of the groove increasing towards the sealing surface and such that the inclined surfaces apply a pressing force to the gasket.

8 Claims, 7 Drawing Figures

SEAL STRUCTURE

BACKGROUND OF THE INVENTION

1. Field of Invention

This invention relates to seal structures and more particularly to sealing structures in which the sealing surface is sealed by the application of a pressing force on a gasket inserted in a groove formed in a flange facing the sealing surface.

2. Prior Art

In automobile engines, the cylinder head 8 and the rocker arm cover 10 are generally designed as shown in FIG. 1. Specifically, a seal structure is usually adopted in which the sealing surface is sealed by the application of a pressing force in a direction roughly perpendicular to the sealing surface on a gasket inserted in a groove formed in a flange facing the sealing surface. This has the conventional seal structure as shown in FIG. 2. In the figures, the head cover or rocker arm cover 10 is equipped with a flange 16. A groove 12 that runs around the entire periphery of the rocker arm cover 10 is performed in the flange 16 for the purpose of holding a gasket 12. This gasket 12 is roughly oval shaped in cross-section. In this conventional seal structure, the seal surface 18 (i.e., the portion of the surface of the cylinder head 8 that is sealed) is sealed by applying a pressing force in a direction roughly perpendicular to the sealing surface 18 by the rocker arm cover 10 (as shown in FIG. 3). Such conventional sealing structures, however, suffer from certain drawbacks. When the rocker arm cover 10 is tightened down with a great deal of force, the sealing surface side of the gasket 12 is caused to protrude outward in a lateral direction as indicated by the arrows A. Accordingly, the seal area becomes excessively large so that the pressing force acting on the sealing surface becomes insufficient and which in some cases results in a loss of the ability to prevent leakage from the inside of the cylinder head.

SUMMARY OF THE INVENTION

Accordingly it is the general object of the present invention to provide a sealing structure which prevents the protrusion of the head gasket and thereby makes it possible to obtain a positive seal.

In keeping with the principles and objects of the present invention, the objects are accomplished by unique sealing structure including a substantially flat sealing surface, a gasket and a groove formed in a flange facing the sealing surface for holding the gasket and for applying a sealing force to the gasket in any direction substantially perpendicular to the sealing surface. The groove is formed such that the groove has inclined surfaces with the width of the groove increasing toward the sealing surface and such that the inclined surfaces apply a pressing force to the gasket.

BRIEF DESCRIPTION OF THE DRAWINGS

The above mentioned features and objects of the present invention will become more apparent with regards to the following description taken in conjunction with the accompanying drawings wherein like referenced numerals denote like elements and in which.

DETAILED DESCRIPTION OF THE INVENTION

Figure 1:
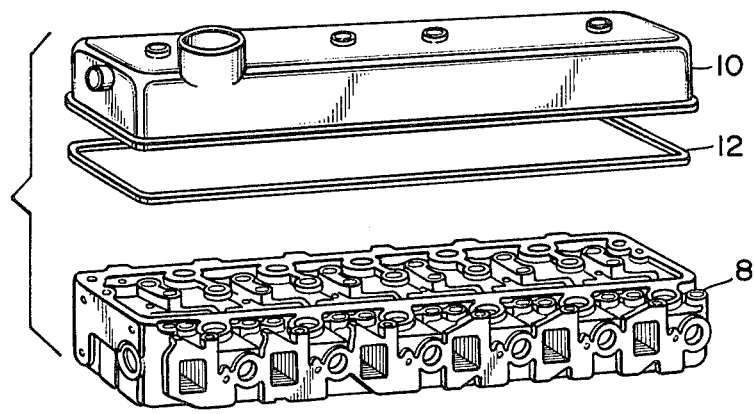
FIG. 1 is an exploded oblique view of an automobile engine cylinder head assembly in which a gasket is utilized.
Figure 2:
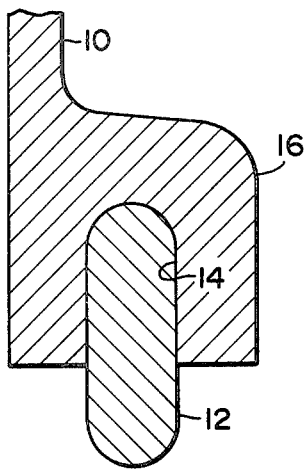
FIG. 2 is a cross-section illustrating a conventional seal structure before it is tightened down.
Figure 4:
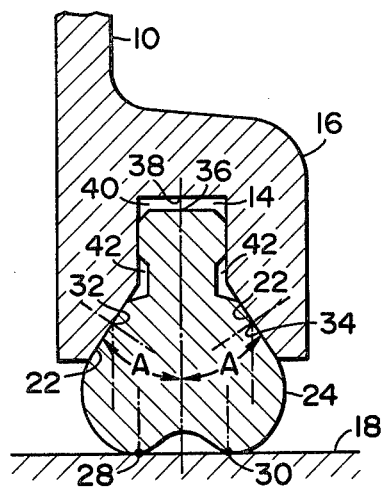
FIG. 4 is a cross-sectional view illustrating one embodiment of a seal structure in accordance with the teachings of the present invention before it is tightened down.
Figure 5:
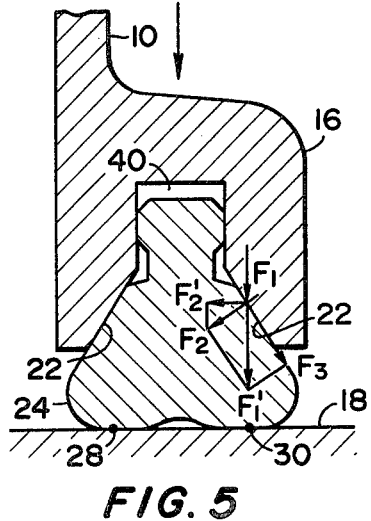
FIG. 5 is a cross-sectional view illustrating a seal structure in accordance with the teachings of the present invention after it has been tightened down.

Referring more particularly to the drawings, shown in FIGS. 4 and 5 are one embodiment of a sealing structure in accordance with the teachings of the present invention. In this embodiment a seal structure using a gasket with a double lip is utilized. Since certain elements of the sealing structure in accordance with the teachings of the present invention are the same as those of the prior art, like elements will be given like referenced numerals and an explanation of their inter-connection and operation will be omitted.

This embodiment differs from conventional seal structures in that inclined surfaces 22 are formed in the groove 14 provided is symmetrical to its own center line are formed in the groove 14 provided in the flange 16. The inclined surfaces 22 are provided such that the width of the groove 14 increases towards the sealing surface 18. The inclined surfaces are utilized in order to apply a pressing force to the double-lip type gasket 24.

The points of contact 28 and 30 between the gasket 24 and the sealing surface 18 are both closer to the center 36 of the gasket than the points of contact to the centers 32 and 34 of the inclined surfaces 22 formed in the groove 14. Furthermore the inclined surfaces 22 are plane surfaces and are both inclined at an angle A with respect to the center line 38 of the groove 14 such that the groove 14 is symmetrical with respect to its own center line. In addition, the angle A should be between 30 and 60 degrees and is preferably 30 degrees.

Furthermore a space 40 is formed in the bottom of the groove 14 for the purpose of absorbing any error in the dimensions of the gasket 24. The gasket 24 is provided with notches 42 formed in the shoulders of the gasket 24 to prevent it from coming in contact with the edge lines of the groove 14.

In operation, when the head cover 10 is pressed against the sealing surface 18 as shown in FIG. 5, a pressing force $F_1$ is applied on each side of the gasket in the form of a component $F_2$ which is perpendicular to the inclined surface 22 on one side and a component $F_3$ which is parallel to the inclined surface 22 on the other side. Accordingly, since the force component $F_2$ which compresses the gasket 24 towards its own center line is applied to the gasket 24, the gasket 24 is prevented from protruding outwardly. Furthermore, it is desirable that the points of contact 28 and 30 be located on lines that are extensions of the components $F_2$ of the pressing force.

An angle of inclination A of 45 degrees at which the components $F_2'$ of the force component $F_2$ which push the gasket 24 inwardly are at a maximum would be desirable except for the fact that the relief of the gasket becomes impossible when the force components $F_2'$ are of an excessive magnitude. This results in a possibility of cracking or loss of resilience of the gasket due to internal stress. Accordingly, it is desirable to set the angle A at some other angle than 45 degrees which is between 30 and 60 degrees. When selecting the angle consideration should be given to the characteristics of the gasket with respect to loss of resilience.

For cases where a double lip type gasket 24 is utilized, it is desirable to design the structure such that the pressing force applied to the center 36 of the gasket and to the sealing surface 18 is not excessive in magnitude. An excessive pressing force on the center of the gasket 24 may also lead to cracking.

Figure 6:
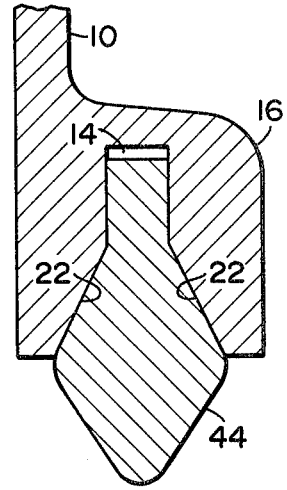
FIG. 6 is a cross-sectional view illustrating a second embodiment of a seal structure in accordance with the teachings of the present invention before it has been tightened down.
Figure 3:
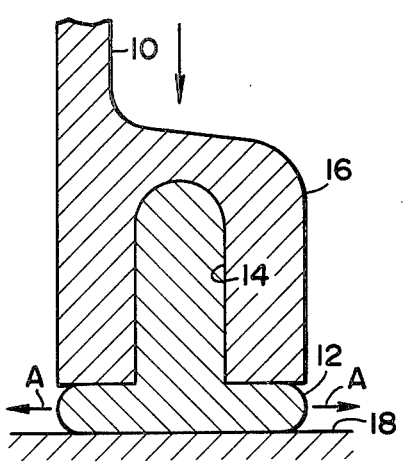
FIG. 3 is a cross-sectional view illustrating a conventional seal structure after it has been tightened down.
Figure 7:
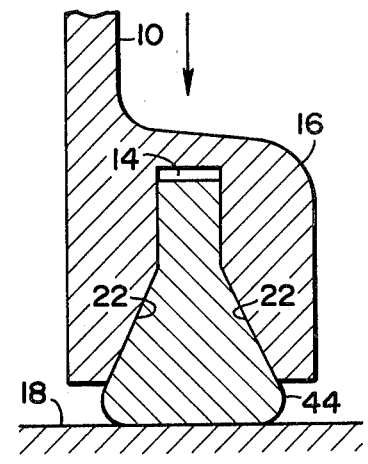
FIG. 7 is a cross-sectional view illustrating a second embodiment of the sealing structure in accordance with the teachings of the present invention after it has been tightened down.

Referring to FIGS. 6 and 7 shown therein is a second embodiment of a sealing structure in accordance with the teachings of the present invention. In this second embodiment, a sealing structure utilizing a center-lip type of single-lip gasket 44 is described. The shape of the gasket 44 used in the second embodiment is as shown in FIG. 6. Since the embodiment of FIGS. 6 and 7 is similar to that of FIGS. 4 and 5, like elements are given like references numerals and a description of the inter-connection and operation will be omitted.

In the above described two embodiments the inclined surfaces 22 is a plane surface. However, the inclined surfaces do not necessarily have to be plane surfaces and it would be also possible to use convex or concave curved surfaces. For cases where inclined surfaces 22 are curved so that there are no edge lines between the inclined surfaces and the bottom portion of the groove 14, it would also be possible to omit the notches 42. Furthermore, in both of the above described embodiments, the present invention was applied to a sealing structure between a cylinder head and rocker arm cover of an automobile engine. It is clear however, that this invention is not limited to such an application and could be applied to a wide range of common seal structures.

From the above description it should be apparent that the present invention has a certain advantage over the prior art. This advantage is that it is able to prevent protrusion of the gasket when a pressing force is applied so that the seal is greatly improved.

It should be apparent to one skilled in the art that the above described embodiments are merely illustrative of but a few of the many possible specific embodiments which represent the applications of the principles of the present invention. Numerous and varied other arrangements can be readily devised by those skilled in the art without departing from the spirit and scope of the invention.

I claim:

1. A sealing structure including a substantially flat sealing surface, a gasket and a groove formed in a flange facing the sealing surface for the gasket and for applying a sealing force to the gasket in a direction substantially perpendicular to the sealing surface, wherein a groove is formed such that the groove has inclined surfaces with the width of the groove increasing towards the sealing surface and such that the inclined surfaces apply a pressing force to the gasket and wherein contacting points along a cross section of the gasket and the sealing surface are closer to the center of the gasket than are the respective centers of the inclined surfaces in the groove.

2. A sealing structure according to claim 1, wherein the angle of inclination of the inclined surface is substantially 30 degrees.

3. A sealing structure according to claim 1 or 2, wherein the inclined surfaces are plain.

4. A sealing structure according to claim 1 or 2, wherein the inclined surfaces are curved.

5. A sealing structure according to claim 1 or 2 wherein, a space is formed in the bottom of the groove for adjusting errors in the dimensions of the gasket.

6. A sealing structure according to claim 1 or 2, wherein a gasket is in contact with the sealing surface at one point in a cross sectional view of the gasket, when a sealing force is applied to the gasket.

7. A sealing structure according to claim 1 or 2, wherein a gasket is in contact with the sealing surface at two points in a cross sectional view of the gasket, when a sealing force is applied to the gasket.

8. A sealing structure including a substantially flat sealing surface, a gasket and a groove formed in a flange facing the sealing surface for the gasket and for applying a sealing force to the gasket in a direction substantially perpendicular to the sealing surface, wherein a groove is formed such that the groove has inclined surfaces with the width of the groove increasing towards the sealing surface and such that the inclined surfaces apply a force to the gasket and wherein notches are formed in the gasket to prevent the gasket from coming into contact with each edge lines of the groove.

* * * * *